(12) United States Patent
Dole et al.

(10) Patent No.: US 10,458,487 B2
(45) Date of Patent: Oct. 29, 2019

(54) COOLING SYSTEM FOR CLUTCH MECHANISM

(71) Applicant: VALEO EMBRAYAGES, Amiens (FR)

(72) Inventors: Arnaud Dole, Amiens (FR); Francois Thibaut, Amiens (FR); Taemann Kim, Amiens (FR); Bruno Manceau, Amiens (FR)

(73) Assignee: VALEO EMBRAYAGES, Amiens (FR)

( * ) Notice: Subject to any disclaimer, the term of this patent is extended or adjusted under 35 U.S.C. 154(b) by 118 days.

(21) Appl. No.: 15/608,418

(22) Filed: May 30, 2017

(65) Prior Publication Data

US 2017/0343057 A1   Nov. 30, 2017

(30) Foreign Application Priority Data

May 31, 2016 (FR) ..................................... 16 54937

(51) Int. Cl.
*F16D 25/04* (2006.01)
*F16D 25/12* (2006.01)
(Continued)

(52) U.S. Cl.
CPC ............ *F16D 25/123* (2013.01); *F16C 19/30* (2013.01); *F16C 37/007* (2013.01); *F16D 21/06* (2013.01);
(Continued)

(58) Field of Classification Search
CPC ...... F16D 25/123; F16D 25/046; F16D 21/06; F16D 25/082; F16D 25/044;
(Continued)

(56) References Cited

U.S. PATENT DOCUMENTS

2005/0139442 A1* 6/2005 Agner ................... F16D 25/123
192/48.8
2011/0114436 A1* 5/2011 Noehl ..................... F16O 33/58
192/48.601
(Continued)

FOREIGN PATENT DOCUMENTS

DE   10 2011 014 778 A1   9/2011
DE   10 2014 205 506 A1   10/2014
DE   10 2014 209 618 A1   12/2014

OTHER PUBLICATIONS

Combined Search Report and Written Opinion dated Feb. 13, 2017 in French Patent Application No. 1654937 (with English translation of categories of cited documents).

*Primary Examiner* — David J Hlavka
(74) *Attorney, Agent, or Firm* — Oblon, McClelland, Maier & Neustadt, L.L.P.

(57) ABSTRACT

A clutch mechanism designed to be installed between an engine and a motor vehicle transmission, wherein the clutch mechanism includes at least one cooling duct arranged to make a cooling fluid circulate toward the clutch, wherein each cooling duct includes an axially extending part and at least one radially extending part, the axially extending part of each cooling duct is situated radially between a transmission shaft and an interior face of the clutch support, and at least one radially extending part of each cooling duct is situated axially between the support bearing and the output hub.

22 Claims, 4 Drawing Sheets

(51) Int. Cl.
*F16D 48/02* (2006.01)
*F16D 21/06* (2006.01)
*F16D 25/08* (2006.01)
*F16C 37/00* (2006.01)
*F16C 19/30* (2006.01)

(52) U.S. Cl.
CPC ......... *F16D 25/044* (2013.01); *F16D 25/046* (2013.01); *F16D 25/082* (2013.01); *F16D 48/0206* (2013.01); *F16C 37/002* (2013.01); *F16C 2361/43* (2013.01); *F16D 25/042* (2013.01); *F16D 2021/0661* (2013.01); *F16D 2300/0214* (2013.01)

(58) Field of Classification Search
CPC ......... F16D 48/0206; F16D 2021/0661; F16D 2300/0214; F16D 25/042; F16C 19/30; F16C 37/007; F16C 2361/43; F16C 37/002

See application file for complete search history.

(56) References Cited

U.S. PATENT DOCUMENTS

2011/0266110 A1\* 11/2011 Arnold ................. F16D 3/66
  192/48.1
2016/0341259 A1\* 11/2016 Maghsoodi ............ F16D 13/38
2017/0089402 A1\* 3/2017 Deakin ................. B60K 6/10

\* cited by examiner

COOLING SYSTEM FOR CLUTCH MECHANISM

TECHNICAL FIELD

The present invention relates to a clutch mechanism, and more particularly to a cooling and lubrication system for such a clutch mechanism. It falls within the field of transmission, especially for motor vehicles.

BACKGROUND ART

From the prior art, clutch mechanisms are known that comprise:
- an engine input hub, which can be connected to a engine input shaft,
- an output hub, which can be connected to a transmission,
- a multiple-disk clutch, supported by a clutch support, wherein the multiple-disk clutch comprises:
  - a plurality of first friction elements connected rigidly in rotation with the input shaft by way of an input disk carrier and the input hub,
  - a plurality of second friction elements connected rigidly in rotation with the output shaft by way of an output disk carrier and the output hub,
- a control system comprising a case and an actuator arranged to configure the clutch in a position between:
  - an engaged configuration, for which the plurality of first friction elements of the clutch is coupled in rotation with the plurality of second friction elements of the said clutch, and
  - a disengaged configuration, for which the plurality of first friction elements of the clutch is decoupled from rotation with the plurality of second friction elements of the said clutch.

During their operation, the frictional forces generated in the area of the multiple-disk clutch generate heat, especially during the transitional phase of frictional engagement of the clutch, during which a non-zero differential speed of rotation exists between the first friction elements and the second friction elements.

In order to guarantee optimum and durable operation of the clutch mechanism, and to limit premature wear of the first and second friction elements, it is known in particular to use a cooling fluid capable of both lubricating and cooling the clutch during its operation. In the document EP 2 905 492 A2, the cooling fluid is introduced into the clutch mechanism via a cooling duct passing through the clutch support.

In order to orient the cooling fluid toward the clutch, the cooling duct often comprises complex shapes, taking into account the available space in the clutch mechanism and its geometry. More particularly, the clutch support comprises, in known manner, a first blind, axially elongated bore permitting the cooling fluid to be introduced into the clutch mechanism, and a second blind, radially extending bore permitting the cooling fluid to circulate in the clutch mechanism, wherein the second bore discharges into the first blind bore.

The production of such a cooling duct is therefore complex, and it necessitates machining in several operations in order to assure fluidic communication between the first and the second bore. More particularly, it is necessary to undertake the machining of the two bores manually and to perform deburring at the intersection of the two bores, in order to guarantee optimum circulation of cooling fluid in the cooling duct on the one hand and in the clutch mechanism on the other hand. Thus the known configurations of cooling ducts employ laborious and complex manufacturing methods, which contribute to increasing the costs of manufacture of clutch mechanisms.

The object of the present invention is to address the foregoing problems at least in large part and in addition to lead to other advantages, which will become apparent from the description and the figures hereinafter.

Another objective of the invention is to propose a new clutch mechanism in order to resolve at least one of these problems.

Another objective of the present invention is to simplify the manufacture of a clutch mechanism and to reduce the cost thereof.

Another objective of the present invention is to reduce the bulkiness of a clutch mechanism.

DISCLOSURE OF THE INVENTION

According to a first aspect of the invention, at least one of the aforesaid objectives is achieved with a clutch mechanism designed to be installed between an engine and a motor vehicle transmission, wherein the said mechanism comprises (i) at least one clutch, (ii) a control system comprising a case and at least one annular piston arranged to be displaced axially relative to the case in order to engage or disengage the clutch by way of at least one transmission bearing, (iii) a clutch support arranged to support the clutch radially by way of a support bearing, wherein the clutch support is situated in a position axially intermediate between the said control system and an output hub of the clutch mechanism, (iv) at least one cooling duct arranged to make a cooling fluid circulate toward the clutch, wherein each cooling duct comprises an axially extending part and at least one radially extending part, the axially extending part of each cooling duct is situated radially between a transmission shaft and an interior face of the clutch support, and at least one radially extending part of each cooling duct is situated axially between the support bearing and the output hub.

According to its first aspect, the invention makes it possible ingeniously to take advantage of the coaxial architecture of a clutch mechanism in order to clear a radial space between the transmission shaft and the clutch support so as to make the cooling fluid circulate there, and more particularly so as to introduce the cooling fluid from the exterior of the clutch mechanism toward the interior of the clutch mechanism.

In addition, the radially extending part is ingeniously designed to discharge into this space. Axially, the radially extending part is situated between the support bearing and the output hub in such a way as to orient the cooling fluid toward the clutch in the most direct manner possible, in order to improve its cooling and/or its lubrication.

This original configuration therefore makes it possible to reduce the number of machining operations in the clutch support by comparison with the prior art.

The invention in accordance with its first aspect therefore makes it possible to simplify the manufacturing processes and to reduce the associated costs.

Furthermore, the present invention in accordance with its first aspect also makes it possible to reduce the radial dimensions of the clutch support, since it is no longer necessary to pass, through this latter, an axially elongated duct that makes it possible to circulate the cooling liquid. The present invention therefore makes it possible to limit the radial bulkiness of the clutch mechanism while increasing the free interior volume situated radially between the clutch support and the clutch, and even to reduce the radial dimensions of such a clutch mechanism.

The clutch mechanism in accordance with the first aspect of the invention preferably comprises a wet or dry clutch.

Advantageously, the mechanism in accordance with the first aspect of the invention comprises two, preferably wet multiple-disk clutches, wherein the control system comprises a first and a second annular piston, arranged respectively to couple or decouple the first and the second clutch with or from a first or a second transmission shaft by way of a first and second output hub.

Each multiple-disk clutch comprises on the one hand a plurality of first friction elements, such as, for example, flanges connected rigidly in rotation with the input shaft by way of an input disk carrier and an input hub, and on the other hand a plurality of second friction elements, such as, for example, friction disks, connected rigidly in rotation with at least one of the transmission shafts by way of a first or second force-transmission means and of a first of second output hub.

The first and second force-transmission means are arranged to transmit an axial force generated by the first and second annular pistons of the control system to the second friction elements.

Alternatively, the plurality of flanges connected in rotation with at least one of the transmission shafts by way of the first or second force-transmission means and of a first or second output hub, and the plurality of friction disks, is connected in rotation with the input shaft by way of an input disk carrier and of an input hub.

The control system is arranged to configure each clutch in a position between:
- an engaged configuration, for which the plurality of first friction elements is coupled in rotation with the plurality of second friction elements, and
- a disengaged configuration, for which the plurality of first friction elements is decoupled from rotation with the plurality of second friction elements.

Each clutch is preferably configured in a position different from the other: if the first clutch is configured in the engaged position, then the second clutch is preferably configured in the disengaged configuration; and if the first clutch is configured in the disengaged position, then the second clutch is preferably configured in the engaged position.

If necessary, the first and second clutches may be simultaneously configured in the disengaged position.

Advantageously, in a clutch mechanism in accordance with the first aspect of the invention, the control system is preferably hydraulic or pneumatic, wherein the annular piston is mounted to slide axially on the case.

The piston is displaced axially relative to the case in such a way as to engage or disengage the corresponding clutch, for example by frictional coupling in the area of the first and second friction elements of the clutch, finally leading to coupling of the input shaft in rotation with one of the transmission shafts.

In the description hereinafter and in the claims, the following terms will be used non-limitatively in order to facilitate understanding:
- "front" or "rear" according to the direction relative to an axial orientation determined by the main axis O of rotation of the transmission system, wherein "rear" denotes the part situated at the right of the figures, on the transmission side, and "front" denotes the left part of the figures, on the engine side; and
- "interior/internal" or "exterior/external" relative to axis O and according to a radial orientation, orthogonal to the said axial orientation.

Preferably, a mechanism in accordance with the first aspect of the invention may comprise, alternatively and additionally, at least one of the first improvements hereinafter, if necessary taken in combination:
- each clutch comprises a plurality of friction elements connected rigidly in rotation with an input shaft, wherein the radially extending part is situated axially in a plane perpendicular to axis O and passing through at least part of the plurality of friction elements, in order to facilitate the propagation of cooling fluid in the direction of each clutch when these are rotating around axis O. In other words, the radially extending part is situated axially perpendicular to at least part of the plurality of friction elements;
- an exterior end of the radially extending part is situated axially between an output disk carrier and an input disk carrier in order to favor the transfer of cooling fluid between each cooling duct and the clutch;
- the radially extending part is oriented in the direction of the friction elements of the clutch in such a way as to optimize the flow of fluid through the first and second friction elements;
- an exterior end of the radially extending part is axially further from the transmission than an interior end of the radially extending part, in such a way that the exterior end of the radially extending part is oriented substantially in a direction opposite a bracing face of the case on the transmission relative to an interior end of the radially extending part;
- the radially extending part is oriented at an angle of between −45° and +45° relative to an axis perpendicular to axis of rotation O;
- the radially extending part is formed by an axial bracing bearing braced axially against the clutch support and the output hub;
- alternatively or additionally, the radially extending part is formed by:
  - at least one bore passing from one side to the other and arranged in the clutch support. Preferably the through bore discharges at a first end onto the interior part of the clutch support, and at a second end onto the exterior part of the clutch support, thus permitting the cooling fluid to circulate between the axially extending part and the clutch;
  - at least one radial bore passing from one side to the other in the axial bracing bearing, wherein the bore discharges toward the interior in the axially extending part of the cooling duct in order to permit cooling fluid to circulate between the axially extending part and the clutch. Alternatively, the axial bracing bearing comprises at least one radial duct passing from one side to the other and discharging toward the interior in the axially extending part of the cooling duct. Toward the exterior, the radial bore and/or the radial duct discharges onto the exterior face of the radial bracing bearing in order to permit the cooling fluid circulating in the axially extending part to be transferred toward the clutch, if necessary, the cooling fluid circulating through the axial bracing bearing passes through a ball or roller or needle guide cage in order to make it possible to lubricate the axial bracing bearing simultaneously with the transfer of cooling fluid between the axially extending part and the clutch;

- at least one annular collar situated between the clutch support and the output hub. The annular collar may be situated between the axial bracing bearing and the clutch support or between the axial bracing bearing and the output huh. If necessary, the clutch mechanism comprises two annular collars situated one side and the other of the axial bracing bearing;
- at least one duct passing from one side to the other in the annular collar, wherein the duct discharges toward the interior in the axially extending part of the cooling duct in order to permit fluidic communication between the axially extending part and the clutch. The number and/or the diameter of the radially extending duct depends on the desired flow rate and/or on the viscosity of the cooling fluid;
- the axial hearing is of the needle type;
- the radially extending ducts of the annular collar are regularly distributed angularly around axis O in order to favor the distribution of the cooling fluid in the area of the clutch during its operation, and more particularly during its rotation around axis O:
- the radially extending part situated between the support bearing and the output hub is a first radially extending part, wherein the cooling duct comprises a second radially extending part situated between the support bearing and the control system in order to permit a better radial distribution of the cooling fluid in the area of the clutch as a function of the clutch dimensions. In fact, in the case of an axially extended clutch, it may be desirable to spray the cooling fluid radially at several axial positions for better cooling and/or better lubrication of the clutch;
- the second radially extending part is formed by a through bore made in the clutch support.
- the input disk carrier of the clutch mechanism comprises at least one radial opening situated in a plane perpendicular to axis O and passing through at least part of the plurality of friction elements, in order to permit better fluidic communication of the cooling fluid exiting radially in the area of the second radially extending part toward the clutch. More particularly, the radial opening is situated perpendicular to at least part of the plurality of friction elements. In addition or alternatively, a mechanism in accordance with the first aspect of the invention or with any one of its first improvements may comprise, alternatively or additionally, at least one of the second improvements hereinafter, if necessary taken in combination:
- the clutch support is arranged to transmit an axial force generated in the area of the annular piston or pistons, especially when this latter is displaced axially to engage the clutch. To accomplish this, the clutch support is blocked axially in a position located axially between the control system and the output hub of the clutch.
- on the side of the output hub and of the engine, the clutch support is braced axially against the output hub by way of at least one axial bearing.
- on the side of the control system, the clutch support is braced axially against the transmission or is fixed rigidly on the control system in such a way that an axial force can be transmitted.
- the clutch support is arranged to support the weight of the clutch radially by way of a support bearing, and more particularly by a roller bearing with oblique contacts, in order that both a radial force and an axial force can be transmitted. The support bearing is locked axially by a locking ring disposed on the side opposite the axial force exerted by the annular piston. In other words, the locking ring is situated axially between the support bearing and the output hub of the clutch. Radially, the support bearing is disposed between the clutch support and the clutch. This configuration makes it possible ingeniously to reduce the radial dimensions of the bearing, since this latter is carried radially as close as possible to axis of rotation O, thus reducing the supported forces and wear of the support bearing;
- preferably, the support bearing is a ball bearing with oblique contacts;
- the case of the control system of the clutch has a plane face arranged to become axially braced on the transmission. The interaction of the plane face of the case with a face opposite the transmission forms the first axial blocking element and, more particularly, in the form of an axial locking element;
- the case of the control system may be made in several pieces. In particular, the control system may comprise an actuating support mounted on the case and situated axially between the case and the output hub. In general, the case designates a mechanical piece of the transmission that is sufficiently rigid that, for example, it is able to couple the control system in rotation and/or axially with the transmission. Alternatively, the actuating support may be press-fitted in a bore of the control system, making it possible to achieve coupling in rotation between the said actuating support and the said control system. In these alternative embodiments based on assembling or press-fitting, the actuating support is at least coupled in rotation with the case, if necessary, the actuating support may be mounted with an axial clearance relative to the transmission in order to guarantee that the axial blocking between the control system and the transmission is achieved in the area of the said control system. In this way, the axial dimensional tolerances of the actuating support are low, thus making it possible to manufacture the said actuating support at less cost. Also if necessary, the actuating support may be mounted in a bore of the control system and without radial clearance relative to the said control system. Preferably, this mounting without clearance is achieved by force, making it possible to achieve coupling in rotation between the said actuating support and the said control system.
- Alternatively, the actuating support is physically integral with the case of the control system;
- the actuating support and/or the case are preferably of metallic material such as steel or aluminum, or possibly of plastic material;
- in the case in which the control system comprises an actuating support mounted on the case, then the means for coupling in rotation are preferably situated radially between the actuating support and the clutch support. In comparable manner, in the case in which the control system comprises an actuating support mounted on the case, then the axial coupling element is preferably situated radially between the actuating support and the clutch support;

According to a second aspect of the invention, a motor vehicle transmission system is proposed that comprises a clutch mechanism in accordance with the first aspect of the invention or with any one of its improvements and coupled in rotation with an input shaft by at least one crankshaft.

Advantageously, the clutch mechanism is coupled in rotation with the input shaft by way of a torsional vibration damper.

Preferably, the transmission system in accordance with the second aspect of the invention comprises (i) a leak-tight enclosure in which the clutch mechanism is housed, (ii) a pump arranged on the one hand to pump the cooling fluid contained in the leak-tight enclosure and on the other hand to inject the cooling fluid into the cooling duct, and (iii) a filtration element arranged to filter the cooling fluid pumped by the pump before it is reinjected into the cooling duct.

Varied embodiments of the invention are provided which, according to all of their possible combinations, integrate the different optional characteristics disclosed here.

DESCRIPTION OF THE FIGURES AND EMBODIMENTS

Other characteristics and advantages of the invention will also become apparent on the basis, on the one hand, of the description hereinafter and, on the other hand, of several exemplary embodiments given by way of non-limitative indication with reference to the attached schematic drawings, wherein.

The embodiments to be described hereinafter are in no way limitative; in particular, it will be possible to imagine variants of the invention comprising only a selection of characteristics described hereinafter in isolation from the other described characteristics, if such selection of characteristics is sufficient to confer a technical advantage or to differentiate the invention from the prior art. This selection comprises at least one characteristic, preferably of functional nature, without structural details, or with only one part of the structural details if such part on its own is sufficient to confer a technical advantage or to differentiate the invention from the prior art.

In particular, all the variants and all the embodiments described may be combined with one another if nothing opposes such combination at the technical level.

In the figures, the elements common to several figures are denoted by the same reference.

Figure 1:
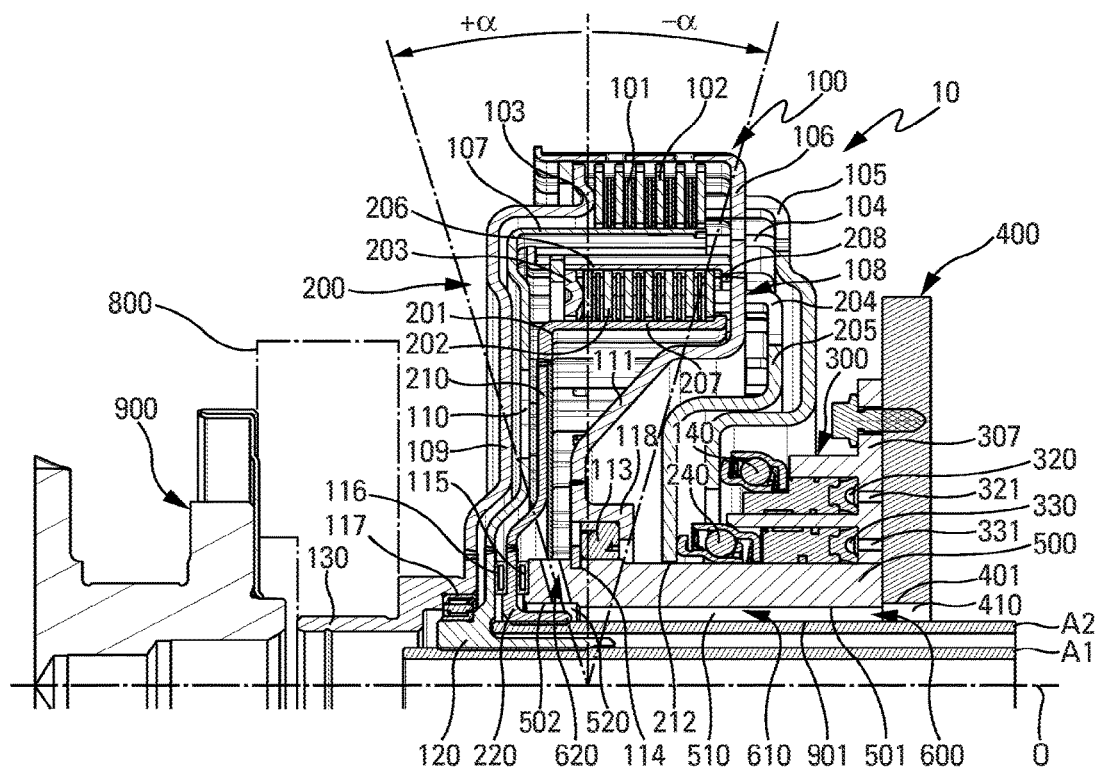
FIG. 1 illustrates a view in axial section of a transmission system comprising a wet double clutch mechanism in accordance with the first aspect of the invention and according to a first embodiment in which the cooling duct comprises a radially extending part situated between the support bearing and the output hub.

FIG. 1 represents a transmission system 1 comprising a clutch mechanism 10, especially for a motor vehicle, having a main axis of rotation O.

In the paragraphs hereinafter, clutch mechanism 10 is presented on the basis of its technical and functional characteristics common to all embodiments in accordance with the first aspect of the present invention. The embodiments will then be described in terms of their specifics and their differences compared with these common technical and functional characteristics. FIG. 1 serves as support for the description of the technical and functional characteristics common to all embodiments of the first aspect of the present invention.

General Embodiment

Clutch mechanism 10 illustrated in FIG. 1 et seq. is a wet double clutch, in what is known as a radial configuration, wherein first clutch 100 is situated preferably exterior to second clutch 200.

Alternatively, clutch mechanism 10 may be configured in what is known as an axial position, wherein first clutch 100 is arranged axially toward the rear and second clutch 200 is arranged axially toward the front.

Also alternatively, clutch mechanism 10 may be a dry double clutch.

Clutch mechanism 10 with wet double clutch is arranged to be able to couple the input shaft selectively with a first transmission shaft A1 or a second transmission shaft A2 by way respectively of first clutch 100 or second clutch 200.

The input shaft is driven in rotation by at least one crankshaft goo and is coupled with crankshaft goo by way of a torsional vibration damper 800.

Preferably, first transmission shaft A1 and second transmission shaft A2 are coaxial.

First clutch 100 and second clutch 200 are preferably of multiple-disk type. Each multiple-disk clutch comprises on the one band a plurality of first friction elements 101, 201, such as, for example, flanges connected rigidly in rotation with the input shaft, and on the other hand a plurality of second friction elements 102, 202, such as, for example, friction disks, connected rigidly in rotation with at least one of the transmission shafts A1, A2.

First transmission shaft A1 is coupled in rotation with the input shaft and is driven thereby in rotation when first clutch 100 is configured in what is known as an engaged position, for which the plurality of first friction elements 101 is coupled in rotation with the plurality of second friction elements 102.

First transmission shaft A1 is decoupled from rotation with the input shaft when first clutch 100 is configured in what is known as a disengaged position, for which the plurality of first friction elements 101 is decoupled from rotation with the plurality of second friction elements 102.

Second transmission shaft A2 is coupled in rotation with the input shaft and is driven thereby in rotation when second clutch 200 is configured in what is known as an engaged configuration, for which the plurality of first friction elements 201 is coupled in rotation with the plurality of second friction elements 202.

Second transmission shaft A2 is decoupled from rotation with the input shaft when second clutch 200 is configured in what is known as a disengaged position, for which the plurality of first friction elements 201 is decoupled from rotation with the plurality of second friction elements 202.

In the context of the invention, transmission shafts A1 and A2 are arranged to be able to cooperate with a transmission 400 such as, for example, a gearbox of the type of those with which motor vehicles are equipped.

In clutch mechanism 10 with wet double clutch illustrated in FIG. 1, first clutch 100 is arranged to engage the odd ratios of transmission 400 and second clutch 200 is arranged to engage the even ratios and reverse movement of transmission 400. Alternatively, the ratios assigned to the said first clutch 100 and second clutch 200 are respectively inverted.

First clutch 100 and second clutch 200 are arranged to transmit what is known as input power—a torque and a speed of rotation—alternatively from the input shaft to one of the two transmission shafts A1, A2, as a function of the respective state of clutches 100 and 200 and by way of an input shroud 109.

Preferably, clutches 100 and 200 are arranged such that they are not simultaneously in the same engaged or disengaged condition. If necessary, first and second clutches 100, 200 may be simultaneously configured in the disengaged position.

Clutch mechanism 10 has, around axis o, at least one input element that is connected in rotation with an input shaft, not illustrated. Preferably, the input element of clutch mechanism 10 comprises at least one input hub 130. Over its interior elongation, input hub 130 is connected in rotation and/or axially with the input shaft, if necessary by way of a torsional vibration damping device 800, such as a damping double flywheel, for example.

Over its exterior elongation, input hub 130 is coupled in rotation with an input shroud 109 in the area of an interior end situated toward the front of the said input shroud 109; preferably they are integral with one another, for example fixed by welding and/or by riveting. On the side of its exterior end, input shroud 109 is connected in rotation with a first clutch 100 by way of an input disk carrier 106, wherein the said input disk carrier 106 is connected in rotation with the said input shroud 109, preferably by interlocking parts, especially of the fluting type.

First and second clutches 100 and 200 are controlled by a control system 300 comprising a first and a second actuator 320, 330. Control system 300 comprises a case 307, the exterior part 301 of which is arranged to receive, if necessary, fixation means 310 cooperating with transmission 400. Case 307 of control system 300 also comprises an interior part 302 having an axial elongation arranged to support first and second actuators 320 and 330. In the area of its part situated toward the rear, control system 300 has what is known as a bracing face 304, which is preferably flat, arranged to be braced flat together with transmission 400. Bracing face 304 is preferably situated axially toward the rear of control system 300.

Case 307 is preferably made in one-piece. If necessary, it may be made by assembly of several pieces. For example, the control system may comprise an actuating support mounted on the case and situated axially at least in part between the case and the output hub. The actuating support is at least coupled in rotation with the case. According to an alternative embodiment, the actuating support is mounted with axial clearance relative to the transmission in order to guarantee that the axial blocking between the control system and the transmission is achieved in the area of the said control system. For this purpose, the actuating support may, for example, be mounted without radial clearance in a bore of the case in order to achieve coupling in rotation between the actuating support and the case of the control system. Alternatively, the actuating support may be press-fitted in a bore of the case.

Preferably, first and second actuators 320 and 330 are hydraulic cylinders. First and second actuators 320, 330 may each comprise an annular piston. Control system 300 comprises a first and a second hydraulic fluid supply channel 321 and 331 for first and second actuators 320, 330. Preferably, the hydraulic fluid is a fluid under pressure, for example oil.

First actuator 320 is arranged to configure each first clutch 100 in a position between the engaged configuration and the disengaged position. More particularly first actuator 320 is axially movable, here from rear to front, between the engaged configuration and the disengaged configuration of first clutch 100.

First actuator 320 is connected to first clutch 100 by way of a first bearing 140 on the one hand and of a first force-transmission means 105 on the other hand.

First bearing 140 is arranged to transmit axial forces generated by first actuator 320 to first force-transmission means 105.

First force-transmission means 105 is arranged to transmit an axial force in the area of its exterior elongation 104 to first clutch 100, wherein the said exterior elongation 104 extends axially toward the front in order to be able to separate first friction elements 101 or to press them against second friction elements 102 on the one hand and against an exterior reaction means 103 of input shroud 109 on the other hand.

Exterior reaction means 103 is coupled in rotation with input hub 130 by way of input shroud 109. Preferably, exterior reaction means 103 and input shroud 109 are made in a single piece, or alternatively in two pieces fixed together by any means such as by riveting or welding.

Exterior reaction means 103 has a shape complementary to those of the first or second friction elements, in such a way as to permit frictional coupling of first and second friction elements 101, 102 when first actuator 320 is exerting an axial force toward the front to configure first clutch 100 in its engaged position. By way of non-limitative example, the reaction means may take the form of a disk that extends radially toward the exterior and has a central zone that extends axially toward the front.

In particular, exterior reaction means 103 has a male fluting that cooperates with a female fluting of input shroud 109.

First clutch 100 is preferably of multiple-disk type. It comprises at least one first friction element 101 such as, for example a friction disk. First friction elements 101 are coupled in rotation with first transmission shaft A1 by way of a first disk carrier 110 forming an output element of first clutch 100.

First output disk carrier 110 has, on its exterior radial periphery, an axial elongation 107, which is equipped with a toothing designed to cooperate with a complementary toothing on each first friction element 101, and more particularly on the interior radial periphery of each first friction element 101. In this way the output disk carrier is coupled in rotation by engagement with first friction elements 101.

In the area of its interior radial end, first output disk carrier 110 is connected to a first output hub 120. First output disk carrier 110 and first output hub 120 are preferably fixed together by welding or alternatively by riveting.

First output hub 120 is provided radially on the interior with axial flutings arranged to cooperate with complementary flutings situated on first transmission shaft A1, in such a way as to achieve coupling in rotation.

First clutch 100 also comprises elastic restoring means for automatically pushing first actuator 320 back into disengaged position. Preferably, the elastic restoring means are formed by elastic washers, such as waved washers of the "Onduflex™" type. The elastic restoring washers are interposed axially between the two friction elements 101, 102. They are preferably arranged radially in the interior of first friction elements 101. Each elastic restoring washer is braced axially against the front radial face of a second friction element 102 and against the rear radial force of another second, axially adjacent friction element 102.

The elastic restoring means urge the second friction elements axially in order to facilitate release of first friction elements 101 and return of first actuator 320 toward the disengaged position.

As a variant, not illustrated, the restoring means of first actuator 320 are formed by at least one compression spring.

Second clutch 200 of clutch mechanism 10 is of design similar to that of first clutch 100, wherein second clutch 200 is preferably of multiple-disk type.

In view of the need for a description of second clutch 200, reference will advantageously be made to the detailed description of first clutch 100 given in the foregoing.

In a manner comparable to the configuration described for first clutch 100, second actuator 330 is arranged to configure second clutch 200 in a position between the engaged configuration and the disengaged position.

Second actuator 330 is connected to second clutch 200 by way of a second bearing 240 on the one hand and of a second force-transmission means 205 on the other hand.

The second actuator preferably comprises an annular piston mounted to slide axially on case 307 of the control system.

Second bearing 240 is arranged on the one hand to transmit axial forces generated by second actuator 330 to second force-transmission means 205 and on the other hand to support the radial load exerted by first force-transmission means 105.

Second force-transmission means 205 is arranged to transmit an axial force in the area of its exterior elongation 204 to second clutch 200, wherein the said exterior elongation 204 extends axially toward the front and through an opening 108 arranged in input disk carrier 106 in order to be able to separate first friction elements 201 or to press them against second friction elements 202 on the one hand and against an interior reaction means 203 on the other hand.

Interior reaction means 203 is integral with an axially elongated part 206 oriented toward the front and integral with input disk carrier 106 by way of a radially extending part 208, which is fixed to input disk carrier 106 by any means, for example by welding or by riveting. Alternatively, interior reaction means 203 and input disk carrier 106 are made in a single piece.

Second force-transmission means 205 is situated axially between input disk carrier 106 and first force-transmission means 105.

On its interior part, second force-transmission means 205 comprises a bore 212 in order to leave an interior space so that radial bracing does not take place on control system 300 or on one of the transmission shafts A1, A2.

Interior reaction means 203 has a shape complementary to that of the first or second friction elements 201, 202, in such a way as to permit frictional coupling of first and second friction elements 201, 202 when second actuator 330 is exerting an axial force toward the front to configure second clutch 200 in its engaged position. By way of non-limitative example, interior reaction means 203 may take the form of a ring with a toothing on the exterior periphery and a central bracing groove that extends axially toward the rear.

Second clutch 200 is preferably of multiple-disk type. It comprises at least one first friction element 201 such as, for example a friction disk. First friction elements 201 are coupled in rotation with second transmission shaft A2 by way of a second disk carrier 210 forming an output element of second clutch 200.

Second output disk carrier 210 is provided on its exterior radial periphery with an axial elongation 207, which is equipped with a toothing designed to cooperate with a complementary toothing on each first friction element 201, and more particularly on the interior radial periphery of each first friction element 201. In this way the second output disk carrier is coupled in rotation by engagement with first friction elements 201.

In the area of its interior radial end, second output disk carrier 210 is connected to a second output hub 220. Second output disk carrier 210 and second output hub 220 are preferably fixed together by welding or alternatively by riveting.

Second output hub 220 is provided radially on the interior with axial flutings arranged to cooperate with complementary flutings situated on second transmission shaft A2, in such a way as to achieve coupling in rotation.

Preferably, second transmission shaft A2 takes the form of a hollow cylinder, in the interior of which first transmission shaft A1 may be inserted.

Second clutch 200 also comprises elastic restoring means for automatically pushing second actuator 330 back into disengaged position. Preferably, the elastic restoring means are formed by elastic washers, such as waved washers of the "Onduflex™" type. The elastic restoring washers are interposed axially between the two friction elements 201, 202. They are preferably arranged radially in the interior of first friction elements 201. Each elastic restoring washer is braced axially against the front radial face of a second friction element 202 and against the rear radial force of another second, axially adjacent friction element 202.

The elastic restoring means urge the second friction elements axially in order to facilitate release of first friction elements 201 and return of second actuator 330 toward the disengaged position.

As a variant, not illustrated, the restoring means of second actuator 330 are formed by at least one compression spring.

Input disk carrier 106 additionally comprises what is known as an interior segment 111, which extends radially toward the interior of clutch mechanism 10 in the area of opening 108 and axially toward the front. At its interior end, interior segment 111 of input disk carrier 106 is braced on a heel piece 118 braced radially on a roller bearing 113 arranged to support the radial load of input disk carrier 106.

Radially, roller bearing 113 is connected rigidly to a clutch support 500 situated in an intermediate axial position between control system 300 and first and second output hubs 120, 220.

Axially, the position of roller bearing 113 is defined toward the front by a stop 114. Stop 114 may preferably be a blocking ring or locking ring. Furthermore, stop 114 may preferably be housed in a groove made on the peripheral surface of clutch support 500.

More generally, ball bearing 113 is disposed radially between clutch support 500 and input disk carrier 106. Axially, support bearing 113 is locked axially by a locking ring 114 disposed on the side opposite the axial force exerted by first or second actuator 320, 330.

Advantageously, roller bearing 113 is a roller bearing with oblique contacts, in order that both a radial force and an axial force can be transmitted. This axial force is taken up in the area of roller bearing 113 by locking ring 114. In fact, when first or second actuator 320, 330 transmits an axial force to the first or second force means 105, 205 in order to configure the corresponding clutch 100, 200 in an engaged or disengaged configuration, an axial force is transmitted between a first end comprising the said first or second actuator 320, 330 and a second end situated in the area of transmission shaft A1, A2.

Furthermore, clutch mechanism 10 comprises at least one cooling duct 600 arranged to make a cooling fluid circulate toward clutch 100, 200, wherein cooling ducts 600 comprise an axially extending part 610 and at least one radially extending part 620.

In a manner common to all embodiments of the invention, axially extending part 610 of cooling duct 600 is situated radially between interior face 501 of clutch support 500 and an exterior face 901 of the transmission shaft A2 situated radially furthest to the exterior. Axially extending part 610 of cooling duct 600 comprises:

- a first section 410 situated radially between an interior face 401 of transmission 400 and an exterior face 901 of transmission shaft A2. Advantageously, first section 410 is formed by a bore of axial orientation passing through transmission 400 from one side to the other in the area of its interior radial end;
- a second section 510 situated radially between a first interior face 501 of clutch support 500 and an exterior face 901 of transmission shaft A2. Advantageously, first section 510 is formed by a bore of axial orientation passing through clutch support 500 from one side to the other in the area of its interior radial end;
- in the area of its front axial end, axially extending part 610 of cooling duct 600 comprises a third section 520 formed by a bore, the radial extension of which is larger than that of the second section: exterior face 502 of axially extending part 610 considered in the area of its front axial end is situated more to the exterior than interior face 501 of clutch support 500 considered in the area of the second section. This broadening of the bore in the area of the front axial end of clutch support 500 also makes it possible to introduce second output hub 220 in order to couple it in rotation with transmission shaft A2.

Thus the invention in accordance with its first aspect proposes to take advantage of the annular space situated between the clutch support and transmission shaft A2 in order to make cooling fluid circulate there.

This advantageous configuration makes it possible to simplify the manufacture of the clutch support, which no longer integrates complex bores for circulation of the cooling fluid.

Different embodiments of the invention in accordance with its first aspect will now be described on the basis of several non-limitative configurations of cooling ducts 600 in clutch mechanism 10, and more particularly on the basis of several configurations of radially elongated parts 620 of cooling duct 600.

In order to facilitate understanding of the invention and of the different embodiments, only some of the specifics and of the technical and functional differences of each embodiment will be described, in comparison with the general embodiment described in the foregoing on the basis of FIG. 1.

First Embodiment

In the first embodiment described on the basis of FIG. 1, cooling duct 600 comprises a radially extending part 620 situated between support bearing 113 and second output hub 220 in order to orient the cooling fluid preferentially in the direction of first and second clutches 100, 200. More particularly, the end radially exterior to radially extending part 620 discharges beyond clutch support 500 between second output disk carrier 210 and input disk carrier 106.

In this embodiment, radially extending part 620 takes the form of a bore made in clutch support 500. The bore forming radially extending part 620 has constant diameter between its interior end and its exterior end. Toward the interior, the bore discharges into third segment 520 of axially extending part 610 of cooling duct 600.

The bore forming radially extending part 620 is oriented substantially toward the front of clutch support 500: the exterior end of radially extending part 620 is situated more to the front than the interior end of radially extending part 620. More particularly, the bore forming radially extending part 620 is oriented at an angle ⌀ of approximately 30° relative to an axis perpendicular to axis of rotation O.

Second Embodiment

Figure 2:
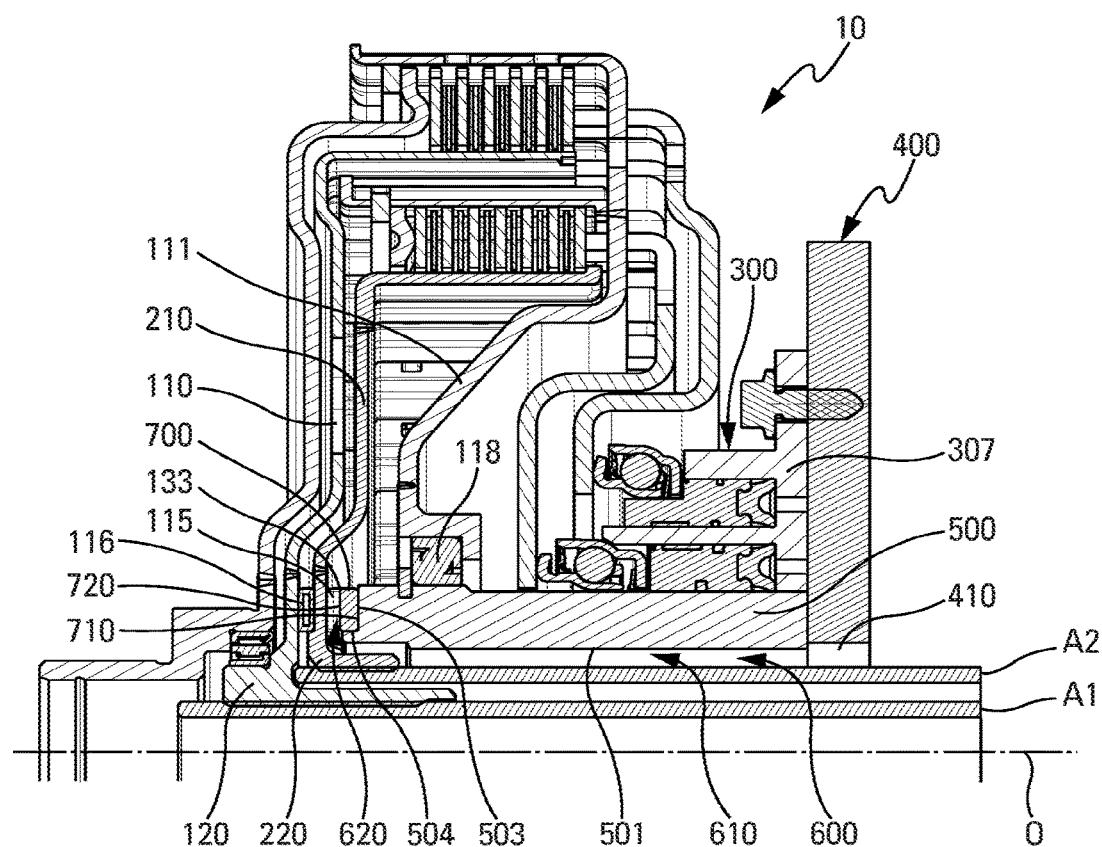
FIG. 2 illustrates a view in axial section of a transmission system comprising a wet double clutch mechanism in accordance with the first aspect of the invention and according to a second embodiment in which an intermediate collar functioning as axial bearing is located between the clutch support and the output hub, wherein the intermediate collar comprises radial ducts.

FIG. 2 illustrates a second embodiment in which an intermediate collar 700 functioning as axial bearing is located axially between clutch support 500 and second output hub 220, wherein intermediate collar 700 comprises radial ducts that make it possible to transfer the cooling fluid in the direction of first and second clutches 100, 200.

More particularly, a rear face 710 of intermediate collar 700 is braced flat together with a front face 503 of clutch support 500; and a front face 720 of intermediate collar 700 is braced flat together with a rear face 133 of the second output hub.

The clutch support may advantageously comprise an axial shoulder 504 arranged to define the position of intermediate collar 700 radially, wherein one of the exterior or interior faces of intermediate collar 700 becomes radially braced against axial shoulder 504. Axial shoulder 504 is preferably situated radially in the interior relative to intermediate collar 700, wherein axial shoulder 504 forms a circumferential span oriented toward the front over an interior part of the front face of clutch support 500.

Alternatively, axial shoulder 504 may be situated radially toward the interior relative to intermediate collar 700, while forming a circumferential span oriented toward the front over an exterior part of the front face of clutch support 500.

Figure 4:
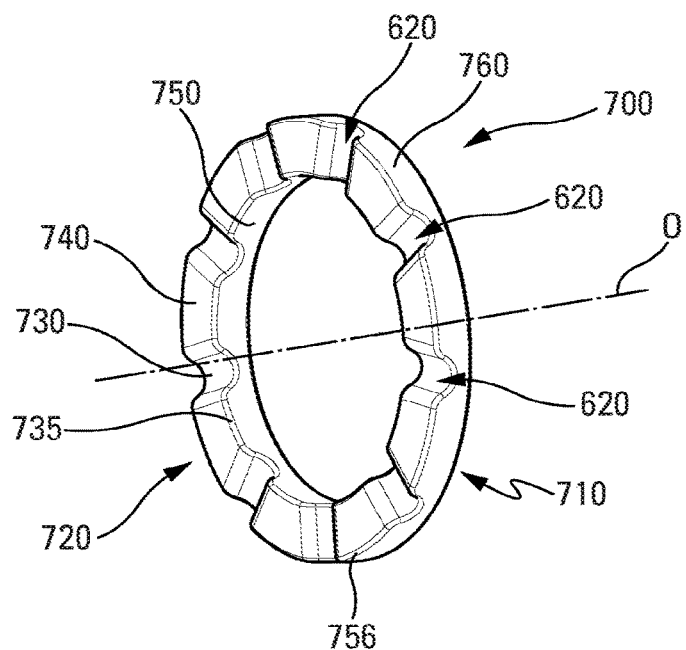
FIG. 4 illustrates a perspective view of an intermediate collar such as used on the basis of FIG. 2.

Referring now to FIG. 4, the intermediate collar takes the form of an annular collar bounded radially toward the exterior by an annular exterior face 760 and toward the interior by an annular interior face 750. The diameter of annular exterior face 760 is advantageously comparable with the outside diameter of clutch support 500. The diameter of annular exterior face 760 is alternatively equal to, slightly smaller than or slightly larger than the outside diameter of clutch support 500. In the case in which axial shoulder 504 is situated on the interior part of the front face of the clutch support, as illustrated in FIG. 2, the diameter of annular interior face 750 of intermediate collar 700 is equal to the outside diameter of axial shoulder 504 in order to achieve radial positioning of intermediate collar 700. In this case, annular interior face 750 is braced against the exterior face of axial shoulder 504.

In the case in which axial shoulder 504 is situated on the exterior part of the front face of the clutch support, the diameter of annular exterior face 760 of intermediate collar 700 is equal to the inside diameter of axial shoulder 504 in order to achieve radial positioning of intermediate collar 700. In this case, annular exterior face 760 is braced against the interior face of axial shoulder 504. The diameter of annular interior face 760 is then advantageously comparable with the inside diameter of clutch support 500. The diameter of annular interior face 750 is alternatively equal to, slightly smaller than or slightly larger than the inside diameter of clutch support 500.

Rear face 710 of intermediate collar 700 is advantageously flat, in such a way that it can be braced flat together with the front face of clutch support 500, or with the rear face of second output hub 220.

Front face 720 of the annular collar comprises a plurality of radially extending ducts 730 that collectively form radially extending parts 620 of cooling duct or ducts 600. Radially extending ducts 730 are preferably spaced regularly around axis O. In the example illustrated in FIG. 4, the intermediate collar comprises nine radially extending ducts 730, wherein the angle between two adjacent radially extending ducts 730 is substantially 40°.

Each radially extending duct 730 has a U-shaped cross section. In other words, each radially extending duct 730 forms a throat permitting the flow of cooling fluid. Radially extending ducts 730 are closed axially by bracing front face 720 of the intermediate collar flat against a face of clutch mechanism 10, such as, for example, the front face of clutch support 500 or the rear face of second output hub 220.

According to a particular embodiment of the invention, it is possible to form a radially extending duct of substantially circular cross section by bringing two intermediate collars 700 into face-to-face contact, braced via their respective front faces 720 and aligned angularly in such a way that each radially extending duct 730 of a first intermediate collar 700 is placed opposite a radially extending duct 730 of a second intermediate collar 700.

Front face 720 of intermediate collar 700 comprises a plurality of segments 740 situated between two adjacent radially extending ducts 730. These sections collectively form a surface for bracing of front face 720 of the intermediate collar against a face of clutch mechanism 10, such as, for example, the front face of clutch support 500 or a face of bearing 115 or the rear face of second output hub 220.

Intermediate collar 700 also comprises, on its front face 720, an exterior chamfer 736 and an interior chamfer 735 in order to facilitate mounting of the intermediate collar on clutch mechanism 10.

Third Embodiment

Figure 3:
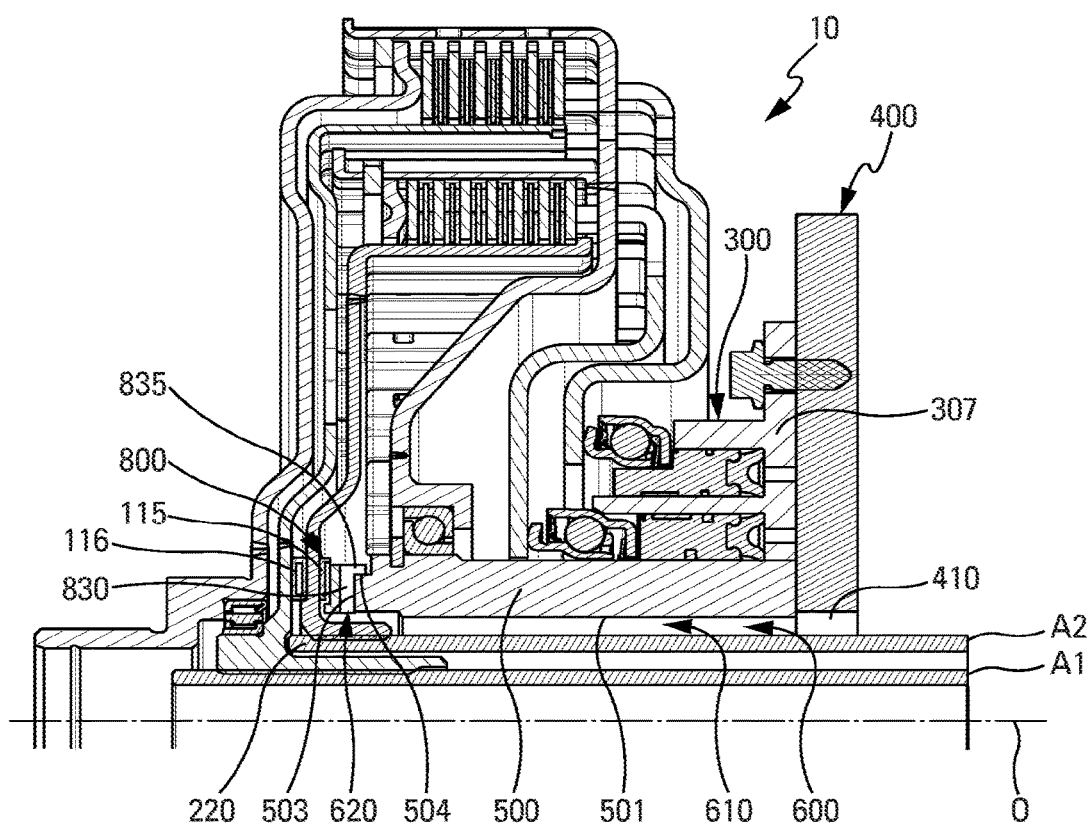
FIG. 3 illustrates a view in axial section of a transmission system comprising a wet double clutch mechanism in accordance with the first aspect of the invention and according to a third embodiment in which the axial bearing situated between the clutch support and the output hub comprises a radially extending part of the cooling duct.
Figure 5:
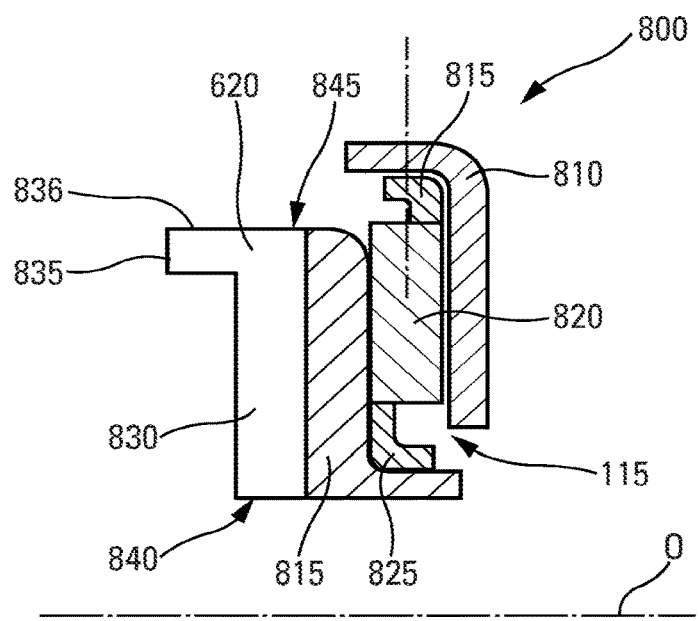
FIG. 5 illustrates a needle bearing comprising a radially extending part of the cooling duct such as used on the basis of FIG. 3.

FIG. 3 illustrates a third embodiment of the invention in accordance with its first aspect and in which bearing 115 situated between clutch support 500 and second output hub 220 comprises a radially extending part of the cooling duct. Complementarily, FIG. 5 illustrates bearing 115 in the form of a needle bearing comprising a radially extending part 620 of cooling duct 600 such as used on the basis of FIG. 3.

In schematic manner, the third aspect of the invention consists in functional integration of intermediate collar 700 in bearing 115. More particularly, needle bearing 115 comprises an axially blocked roller 830 in the interior of a cage formed by a first wall 810 and a second wall 815, wherein at least one of the first 810 or second 815 walls comprises a plurality of radially extending ducts 830 that collectively form radially extending parts 620 of cooling duct 600. In the example illustrated in FIG. 5, only second wall 815 of needle bearing 115 comprises radially extending ducts 830.

Each radially extending duct 830 is preferably formed by a radial bore that permits the cooling fluid to pass radially through needle bearing 115. Each radially extending duct 830 extends radially between an interior face 840 and an exterior face 845 of needle bearing 115. The plurality of radially extending ducts 830 preferably has regular angular spacing around axis O.

In the example illustrated in FIG. 3, radially extending ducts 830 of needle bearing 115 are situated toward the rear, i.e. on the side of clutch support 500. Alternatively, radially extending ducts 830 of needle bearing 115 are situated toward the front, i.e. on the side of second output hub 220.

In a manner comparable to the second embodiment, clutch support 500 comprises an axial shoulder 504 arranged such that it radially defines the position of needle bearing 115. The needle bearing comprises an axial centering shoulder 835, which interacts with an axial shoulder 504 of clutch support 500. Axial shoulder 504 forms a circumferential span oriented toward the front over an interior part of the front face of clutch support 500, wherein an interior face of axial centering shoulder 835 of needle bearing 115 becomes braced radially against axial shoulder 504.

In the example illustrated in FIG. 5, axial shoulder 504 is situated on the exterior part of front face 503 of clutch support 500, and the diameter of exterior face 836 of axial centering shoulder 835 is equal to the inside diameter of axial shoulder 504 in order to achieve radial positioning of intermediate needle bearing 115.

Of course, the invention is not limited to the examples that have just been described, and numerous arrangements may be added to these examples without going beyond the scope of the invention. In particular, the different characteristics, forms, variants and embodiments of the invention may be associated with one another according to diverse combinations, provided they are not incompatible or mutually exclusive. In particular, all the variants and all the embodiments described in the foregoing may be combined with one another.

The invention claimed is:

1. A clutch mechanism designed to be installed between an engine and a motor vehicle transmission, the clutch mechanism comprising:
   at least one clutch rotating around an axis O;
   a control system of the at least one clutch comprising:
      a case; and
      at least one annular piston arranged to be displaced axially relative to the case in order to engage or disengage the at least one clutch by way of at least one transmission bearing;
   a clutch support arranged to support the at least one clutch radially by way of a support bearing, wherein the clutch support is situated in a position axially intermediate between the control system and an output hub of the clutch mechanism;
   at least one cooling duct arranged to make a cooling fluid circulate toward the at least one clutch, wherein the at least one cooling duct comprises an axially extending part and at least one radially extending part;
   wherein the axially extending part of each cooling duct is situated radially between a transmission shaft and an interior face of the clutch support, and at least one radially extending part of each cooling duct is situated axially between the support bearing and the output hub.

2. The clutch mechanism according to claim 1, wherein the at least one clutch comprises a plurality of first friction elements connected rigidly in rotation with an input shaft and the clutch mechanism wherein the radially extending part is situated axially in a plane perpendicular to the axis O and passing through at least part of the plurality of friction elements.

3. The clutch mechanism according to claim 1, wherein an exterior end of the radially extending part is situated axially between an output disk carrier and an input disk carrier.

4. The clutch mechanism according to claim 2, wherein the radially extending part is oriented in the direction of the friction elements of the at least one clutch.

5. The clutch mechanism according to claim 4, wherein the radially extending part is oriented at an angle of between −45° and 45° relative to an axis perpendicular to the axis O.

6. The clutch mechanism according to claim 1, wherein the radially extending part is formed by a bore passing from a first side of the radially extending part to a second side of the radially extending part and made in the clutch support.

7. The clutch mechanism according to claim 1, wherein the radially extending part is formed by an axial bracing bearing braced against the clutch support and the output hub.

8. The clutch mechanism according to claim 7, wherein the radially extending part is formed by at least one radial bore passing from a first side of the radially extending part to a second side of the radially extending part in the axial bracing bearing, wherein the bore discharges toward the interior in the axially extending part of the cooling duct.

9. The clutch mechanism according to claim 7, wherein the axial bracing bearing is of the needle type.

10. The clutch mechanism according to claim 1, wherein the radially extending part is formed by an annular collar situated between the clutch support and the output hub.

11. The clutch mechanism according to claim 10, wherein the radially extending part is formed by at least one duct passing from a first side of the radially extending part to a second side of the radially extending part in the annular collar, wherein the duct discharges toward the interior in the axially extending part of the cooling duct.

12. The clutch mechanism according to claim 1, wherein the radially extending part situated between the support bearing and the output hub is a first radially extending part, wherein the cooling duct comprises a second radially extending part situated between the support bearing and the control system.

13. The clutch mechanism according to claim 12, wherein the second radially extending part is formed by a through bore made in the clutch support.

14. The clutch mechanism according to claim 2, wherein the input disk carrier of the clutch mechanism comprises at least one radial opening situated in a plane perpendicular to the axis O and passing through at least part of the plurality of the friction elements.

15. A motor vehicle transmission system, comprising:
 a leak-tight enclosure in which the clutch mechanism according to claim 1 is housed;
 a pump arranged on the one hand to pump the cooling fluid contained in the leak-tight enclosure and on the other hand to inject the cooling fluid into the cooling duct; and
 a filtration element arranged to filter the cooling fluid pumped by the pump before it is reinjected into the cooling duct.

16. The clutch mechanism according to claim 2, wherein an exterior end of the radially extending part is situated axially between an output disk carrier and an input disk carrier.

17. The clutch mechanism according to claim 2, wherein the radially extending part is oriented in the direction of the friction elements of the clutch.

18. The clutch mechanism according to claim 17, wherein the radially extending part is oriented at an angle of between −45° and 45° relative to an axis perpendicular to the axis of rotation O.

19. The clutch mechanism according to claim 5, wherein the radially extending part is formed by a bore passing from a first side of the radially extending part to a second side of the radially extending part and made in the clutch support.

20. The clutch mechanism according to claim 5, wherein the radially extending part is formed by an axial bracing bearing braced against the clutch support and the output hub.

21. A clutch mechanism designed to be installed between an engine and a motor vehicle transmission, wherein the clutch mechanism comprises:
 a first clutch and a second clutch rotating around an axis;
 a control system of the clutches comprising:
 a case; and
 a first annular piston and a second annular piston arranged to be displaced axially relative to the case in order to engage or disengage respectively the first clutch and the second clutch by way of transmission bearings;
 a clutch support arranged to support the first clutch and the second clutch radially by way of a support bearing, wherein the clutch support is situated in a position axially intermediate between the control system and an output hub of the clutch mechanism:
 at least one cooling duct arranged to make a cooling fluid circulate toward the first clutch and the second clutch, wherein each cooling duct comprises an axially extending part and at least one radially extending part;
 wherein the axially extending part of each cooling duct is situated radially between a transmission shaft and an interior face of the clutch support, and at least one radially extending part of each cooling duct is situated axially between the support bearing and the output hub, and
 wherein the clutch support is physically integral with the case of the control system.

22. A clutch mechanism designed to be installed between an engine and a motor vehicle transmission, wherein the clutch mechanism comprises:
 a clutch rotating around an axis;
 a control system of the clutch comprising:
 a case; and
 an annular piston arranged to be displaced axially relative to the case in order to engage or disengage the clutch by way of a transmission bearing;
 a clutch support arranged to support the clutch radially by way of a support bearing, wherein the clutch support is situated in a position axially intermediate between the control system and an output hub of the clutch mechanism:
 at least one cooling duct arranged to make a cooling fluid circulate toward the clutch, wherein each cooling duct comprises an axially extending part and at least one radially extending part;
 wherein the axially extending part of each cooling duct is situated radially between a transmission shaft and an interior face of the clutch support, and at least one radially extending part of each cooling duct is situated axially between the support bearing and the output hub.

* * * * *